April 28, 1936.
R. F. PEO
2,038,597
INDIVIDUAL WHEEL SUSPENSION
Original Filed Feb. 10, 1934    2 Sheets-Sheet 1
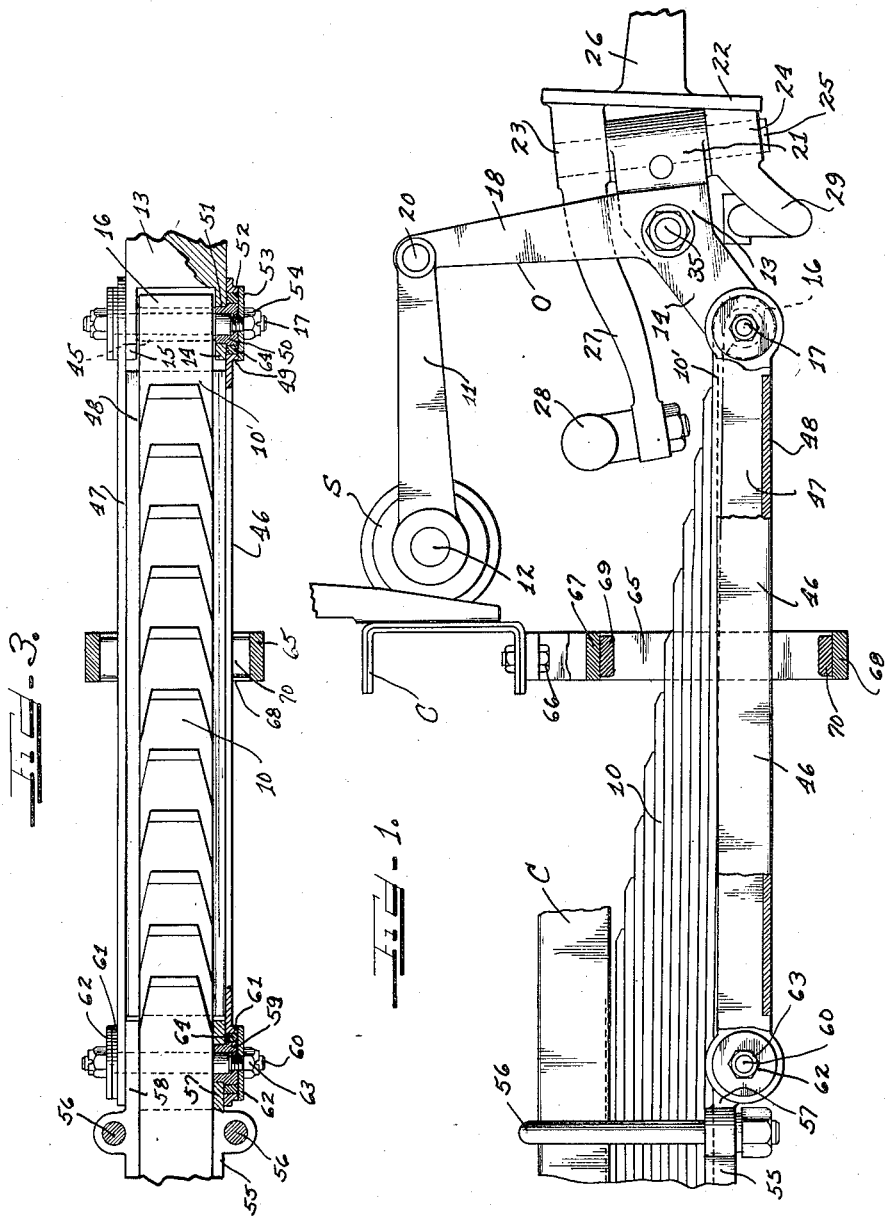
Inventor
Ralph F. Peo.
by Charles H. Willetts April 28, 1936. R. F. PEO 2,038,597
INDIVIDUAL WHEEL SUSPENSION
Original Filed Feb. 10, 1934 2 Sheets-Sheet 2
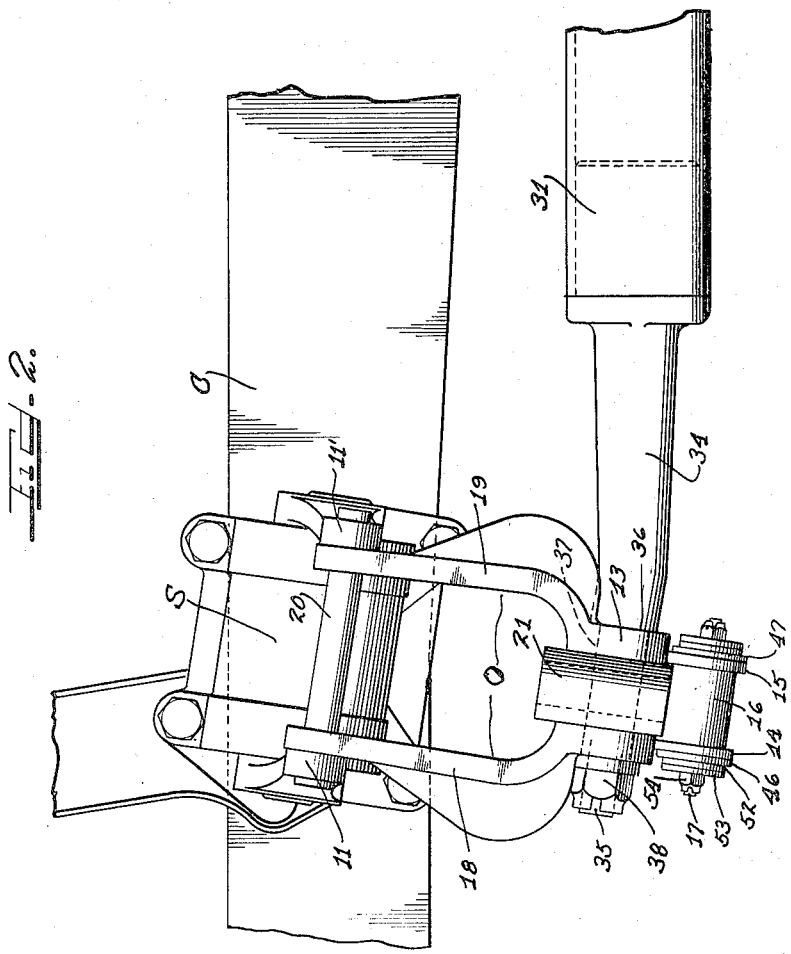

Patented Apr. 28, 1936

2,038,597

UNITED STATES PATENT OFFICE 2,038,597

INDIVIDUAL WHEEL SUSPENSION

Ralph F. Peo, Buffalo, N. Y., assignor to Houde Engineering Corporation, Buffalo, N. Y., a corporation of New York Original application February 10, 1934, Serial No. 710,649. Divided and this application May 7, 1934, Serial No. 724,289

10 Claims. (Cl. 267—19)

My invention relates to individual wheel suspension for automotive vehicles and particularly to that type of suspension in which the end of a transversely extending cantilever spring forms one of the links of the linkage quadrilateral between the vehicle body and the wheel to be suspended. This application is a division of my co-pending application, Serial No. 710,649, filed February 10, 1934, to cover structure disclosed but not claimed in my co-pending application.

One of the important objects of the invention is to provide improved means for safeguarding against breaking of the vehicle spring and to prevent undue bending of the spring and tilting of the wheels under lateral stresses, as when the vehicle is making a turn.

Another important object is the provision of a comparatively non-flexible member or arm below the vehicle spring and pivoted at its inner end to the vehicle chassis and at its outer end to the outer link of the linkage, said guidearm serving to strengthen the linkage structure against undue distortion without interfering with the proper functioning thereof and serving also to receive the spring in case of breakage thereof and to then function as the lower link of the suspension linkage until the spring can be repaired or replaced.

A further object is to provide improved means for limiting the up and down movement of the spring end and the safety arm structure therebelow.

The above referred to and other features of the invention are incorporated in the structure shown on the drawings, in which drawings:

Figure 1 is a front elevation of a vehicle chassis and a linkage structure together with the strengthening and safety arm structure below the spring;

Figure 2 is a side elevation of the structure shown in Figure 1 but with the steering knuckle structure removed;

Figure 3 is a plan view of the spring and the safe guarding means.

I have shown my invention applied to the type of automobile having a transversely extending cantilever leaf spring 10 at the front secured at its middle to the vehicle chassis frame C. Each end of the spring forms the lower link of a linkage quadrilateral for suspending the corresponding wheel structure. The vehicle body forms the inner side link of the suspension linkage, the upper link structure of the linkage being the two lever arms 11 and 11' secured to and extending from the opposite ends of the piston shaft 12 of a hydraulic shock absorber structure S whose body or housing, which forms the hydraulic working chamber, is rigidly secured to the side of the vehicle chassis. The shock absorber is preferably of the balanced vane type such as the shock absorber disclosed in my co-pending application, Serial No. 706,487, filed January 14, 1934.

The outer link structure of the linkage quadrilateral is formed by the member designated as a whole O. This member comprises a body 13 from which arms 14 and 15 extend downwardly and inwardly to receive between their outer ends the eye 16 formed at the end of the vehicle spring, a pivot bolt 17 extending through the arms and the eye to form the pivot connection.

Arms 18 and 19 extend upwardly from the body 13 and are pivoted to the outer ends of the shock absorber levers 11 and 11' by a pivot bolt 20. Extending outwardly from the body 13 is the knuckle boss 21 for supporting the steering knuckle block or member 22 having the upper and lower bearing lugs 23 and 24 extending inwardly therefrom and between which the knuckle boss 21 is received, the king bolt 25 extending through the lugs and the knuckle boss to pivot the knuckle block to the boss, the knuckle block supporting the spindle or axle 26 on which the vehicle wheel is mounted.

The steering lever 27 extends from the upper lug 23 on the steering knuckle block and is connected with the drag link 28 having connection with the steering wheel of the automobile. The arm 29 extends from the lower bearing lug 24 on the steering knuckle block and is connected with one end of a cross-link (not shown) which at its other end is connected with the lower lever on the steering knuckle block of the opposite wheel. The structure thus far described provides individual flexible suspension for the steering wheel of an automobile, the hydraulic shock absorber included in the linkage quadrilateral controlling and absorbing the road shock.

When a vehicle is traveling over rough roads and during side sway thereof or while rapidly turning corners, the vehicle spring which forms part of the suspension linkages will be subjected to heavy strain of tension, compression and bending, particularly the long leaf of the spring which is pivoted at its end to the outer link of the linkage quadrilateral, and the spring, particularly the longer leaves thereof, may break. It is an important object of this invention to provide means for guarding against collapse of the suspension linkage and accident under such conditions. In the arrangement shown, the pivot eyes 16 at the ends of the lower or long spring leaf 10' are below the plane of this leaf and each eye receives the pivot pin or bolt 17 supported in the arms 14 and 15 extending downwardly from the corresponding outer link structure O, a bearing bushing 45 being preferably inserted between the eye and the bolt. Each end of the spring forming part of the corresponding linkage quadrilateral is paralleled by arms or levers 46 and 47 at the opposite sides thereof and these arms are bridged by a wall 48 below the spring. The lever or arm structure could be a length of channel beam.

The arm or lever structure extends from the pivot axis of the spring end to, or approximately to, the point of flexing of the lower spring leaf. At the outer ends the arms or channel sides 46 and 47 have the apertures 49 for receiving bearing bushings 50 fitting in the bearing openings 51 in the arms 14 and 15 extending from the outer side link member O of the suspension linkage, these bushings 50 journalling the ends of the pin or bolt 17 to which the spring end is pivoted. To provide sufficient bearing surface the material around the apertures 49 is deflected to form bearing flanges 52. Washers 53 receive the outer ends of the pivot bolt 17 and are held against the bushings 50 by nuts 54 and extend in front of the bearing flanges 52 to hold the lever arms 46 and 47 in proper pivotal position relative to the bushings.

At its middle the vehicle spring 10 is securely clamped between the front cross beam of the vehicle chassis and the clamping fitting 55 by means of U or strap bolts 56. Extending from the clamp fitting 55 below and in front and rear of the spring 10 are the pivot lugs or walls 57 and 58 which are apertured to receive the bearing bushings 59 through which extend the pivot pin or bolt 60. The axis of this bearing bushing is at, or substantially at, the flexure axis of the lower leaf of the spring. The formation of the arms 46 and 47 at their inner ends is the same as at their outer ends, the inner ends being apertured and flanged as indicated at 61 to surround the bearing bushings 59, the washers 62 being secured to the bolt ends by nuts 63.

The axis of the bolt 60 is substantially the same distance below the lower leaf of the spring as the axis of the bolt 17 which pivots the end of the spring leaf to the outer link structure O so that the arm or lever structure substantially parallels the long or lower leaf of the spring with the bottom 48 of the lever substantially parallel with and short distance below the bottom leaf. As the suspension linkage operates during running of the car this lever structure will follow the movement of the spring and in order to prevent interference with the lengthening or shortening of the spring as the spring flexes the pivot connections of the lever structure are made yieldable and this may be accomplished by the interposition of resilient bushings 64 between the bearing flanges of the arms 46 and 47 and the bearing bushings 50 at the outer ends of the arms, and the bearing bushing 59 at the inner ends of the arms. The lever structure will strengthen the linkage structure against undue distortion but, on account of the yieldable pivot connections, will not interfere with the proper functioning of the suspension linkages. So long as the spring remains intact it will form the resilient lower link of the suspension linkage but should the spring break, as for example at the outer end of the lower leaf, the spring will recoil and rest against the bottom 48 of the lever structure and this lever structure will then form a rigid lower link for the suspension linkage quadrilateral and the wheel will be held in upright position and the suspension linkage will operate safely until repairs can be made. In other words, so long as the vehicle spring is intact, the lever structure acts merely to guard against undue distortion of the suspension linkage quadrilateral and protects the spring against undue strain, but in case of breakage of the spring this lower link structure will take up the burden and act, in place of the spring, as the lower link of the suspension linkage until repairs or replacements can be made. Accidents will thus be avoided in case of spring breakage or failure.

As an additional precaution to insure safety and to limit the relative movement between the chassis and the spring in order to prevent undue and unnecessary movement of the suspension linkage vertically and to protect it against strain and injury, an abutment structure in the form of a rectangular frame 65 may be suspended from the vehicle chassis. The frame is secured to the chassis by suitable bolts 66 and has the upper cross wall 67 and the lower cross wall 68 between which cross walls the vehicle spring and the lever structure 48 extend. Secured to the upper cross wall is a resilient and cushioning member 69 such as a block or pad of rubber and on the lower cross wall 68 is a similar cushioning member 70. The upper cushioning member is engaged by the spring to limit the undue movement of the spring toward the chassis and the lower abutment member is engaged by the lever structure 48 upon undue movement of the spring structure away from the chassis. The up and down movement of the suspension linkage and wheel is thus kept within proper and safe limits.

Displacement of the suspension linkages in direction longitudinally of the vehicle is prevented by radius arms 31 which are of strong construction and resistance against compression as well as tension. At their rear ends, these arms may be suitably secured or pivoted to the vehicle chassis, at the sides thereof, or at the longitudinally center line. The front portions 34 of the arms terminate in bearing ends 35 which extend through bearing bores 37 in the bodies 13 of the outer link structures O. These bearing ends are inserted in the bores with their shoulders 36 abutting against the rear sides of the link bodies and at their outer ends are threaded to receive a nut 38 for engaging against the front side of the link body 13. These brace or radius rod structures will take up all longitudinal strains and stresses and twisting or torsional strains due particularly to brake torque and the push of the wheels, while at the same time the fulcrum and bearing connection of the brace structure with the linkages will permit sufficient yield so as not to interfere with the proper functioning of the wheels and their linkages and will leave their wheel structure free to rise and fall without interference with the other wheel structure.

While I have shown a practical and efficient embodiment of the various features of my invention, I do not desire to limit it to the exact construction, arrangement and operation shown and described as changes and modifications are possible which would still come within the scope of the invention.

I claim as follows:

1. In individual wheel suspension for vehicles, the combination of a vehicle chassis, a leaf spring secured to the chassis and extending therefrom, a linkage quadrilateral comprising an outer side link providing bearing support for a vehicle wheel, an upper link extending between the upper end of said side link and the vehicle chassis, said spring at its outer end being pivoted to the lower end of said side link and forming the lower resilient link of said linkage, and an arm paralleling said spring, said arm being pivotally anchored near the anchored end of said spring and being pivoted at its outer end to said side link concentric with the pivot connection of the spring with said side link, one of the pivotal connections of said arm link being yielding whereby to permit lengthening and shortening of said spring.

2. In individual wheel suspension for vehicles, the combination of a vehicle chassis, a leaf spring secured to the chassis and extending therefrom, a linkage quadrilateral comprising an outer side link providing bearing support for a vehicle wheel, an upper link extending between the upper end of said side link and the vehicle chassis, said spring at its outer end being pivoted to the lower end of said side link and forming the lower resilient link of said linkage, and an arm alongside of said spring, said arm being pivotally anchored near the anchored end of said spring and having yieldable pivot connection at its outer end with said side link concentric with the pivot connection of the spring with said side link, and a wall on said arm extending underneath said spring.

3. In individual wheel suspension for vehicles, the combination of a vehicle chassis, a leaf spring secured to the chassis and extending therefrom, a linkage quadrilateral comprising an outer side link providing bearing support for a vehicle wheel, an upper link extending between the upper end of said side link and the vehicle chassis, said spring at its outer end being pivoted to the lower end of said side link and forming the lower resilient link of said linkage, and an arm paralleling said spring, said arm being pivotally anchored near the anchored end of said spring and being pivoted at its outer end to said side link concentric with the pivot connection of the spring with said side link, the pivotal connections of said arm being yielding whereby to prevent interference of said arm with the lengthening and shortening of said spring when under flexure.

4. In individual wheel suspension for vehicles, the combination of a vehicle chassis, a spring extending therefrom and anchored at its inner end to the chassis, a suspension linkage comprising an outer link providing bearing support for a vehicle wheel, an upper link connecting between the upper end of said outer link and the vehicle chassis, said spring at its outer end being pivoted to the lower end of said outer link and forming a resilient lower link for said linkage, arms at opposite sides of said spring extending substantially parallel therewith, said arms at their outer ends being pivoted to said outer link concentric with the pivot connection of the spring therewith and said arms at their inner ends being pivotally anchored at substantially the point of flexure of said spring, the pivotal connections of said arms being yielding whereby to permit lengthening and shortening of said spring.

5. In individual wheel suspension for vehicles, the combination of a vehicle chassis, a spring extending therefrom and anchored at its inner end to the chassis, a suspension linkage comprising an outer link providing bearing support for a vehicle wheel, an upper link connecting between the upper end of said outer link and the vehicle chassis, said spring at its outer end being pivoted to the lower end of said outer link and forming a resilient lower link for said linkage, arms at opposite sides of said spring extending substantially parallel therewith, said arms at their outer ends having yieldable pivot connections with said outer link concentric with the pivot connection of the spring therewith and said arms at their inner ends being pivotally anchored at substantially the point of flexure of said spring, and a cross wall connecting said arms and being underneath said spring whereby upon breakage of said spring it will be received by said cross wall and held thereon by said arms.

6. In individual wheel suspension for vehicles, the combination of a vehicle chassis, a leaf spring secured to the chassis and extending therefrom, a linkage quadrilateral comprising an outer side link providing bearing support for a vehicle wheel, an upper link extending between the upper end of said side link and the vehicle chassis, said spring at its outer end being pivoted to the lower end of said side link and forming the lower resilient link of said linkage, and an arm paralleling said spring, said arm being pivotally anchored near the anchored end of said spring and being pivoted at its outer end to said side link concentric with the pivot connection of the spring with said side link, the pivot connections of said arm including resilient bushings whereby to be yieldable to permit lengthening and shortening of said spring under flexure when in service.

7. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between said outer link and the chassis, said spring being pivoted at its outer end to said outer link and forming a resilient lower link for said linkage, an arm extending below said spring, said arm being pivotally anchored near the inner end of said spring and being pivoted to said outer link concentric with the pivot connection of the spring therewith, means in the pivotal connection of said arm for permitting lengthening and shortening of said spring, said arm serving as a support for said spring in case of breakage thereof and to function as the lower link of said linkage in case of such breakage.

8. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between said outer link and the chassis, said spring being pivoted at its outer end to said outer link and forming a resilient lower link for said linkage, an arm extending below said spring, said arm being pivotally anchored near the inner end of said spring and being pivoted to said outer link concentric with the pivot connection of the spring therewith, one of the pivot connections of said arm being yielding whereby to permit lengthening and shortening of said spring, said arm serving as a support for said spring in case of breakage thereof and to function as the lower link of said linkage in case of such breakage, an abutment above said spring and an abutment below said arm, said abutments being supported from the vehicle chassis and serving to limit the vertical movement of said linkage.

9. In individual wheel suspension for vehicles, the combination of a vehicle chassis, a leaf spring secured to the chassis and extending therefrom, a linkage quadrilateral comprising an outer side link providing bearing support for a vehicle wheel, an upper link extending between the upper end of said side link and the vehicle chassis, said spring at its outer end being pivoted to the lower end of said side link and forming the lower resilient link of said linkage, an arm paralleling said spring, said arm being pivotally anchored near the anchored end of said spring and being pivoted at its outer end to said side link concentric with the pivot connection of the spring with said side link, one of said arm pivot connections including resilient bushing structure whereby to permit lengthening and shortening of said spring.

10. In individual wheel suspension for vehicles, the combination of a vehicle chassis, a leaf spring anchored at its inner end to said chassis and extending laterally therefrom, a linkage quadrilateral comprising an outer link providing bearing support for a vehicle wheel, an upper link extending between said outer link and the chassis, said spring being pivoted at its outer end to said outer link and forming a resilient lower link for said linkage, an arm extending below said spring and parallel therewith, said arm being pivotally anchored near the inner end of said spring and being pivoted at its outer end to said outer link, one of said arm pivot connections being yielding whereby to permit lengthening and shortening of said spring, said arm being of channel shaped cross section whereby to provide a trough for receiving and supporting said spring in case of breakage thereof.

RALPH F. PEO.